July 19, 1966  J. O. CARR  3,261,167
METHOD FOR REMOVAL OF CONTAMINANTS FROM GAS
Filed Sept. 19, 1962
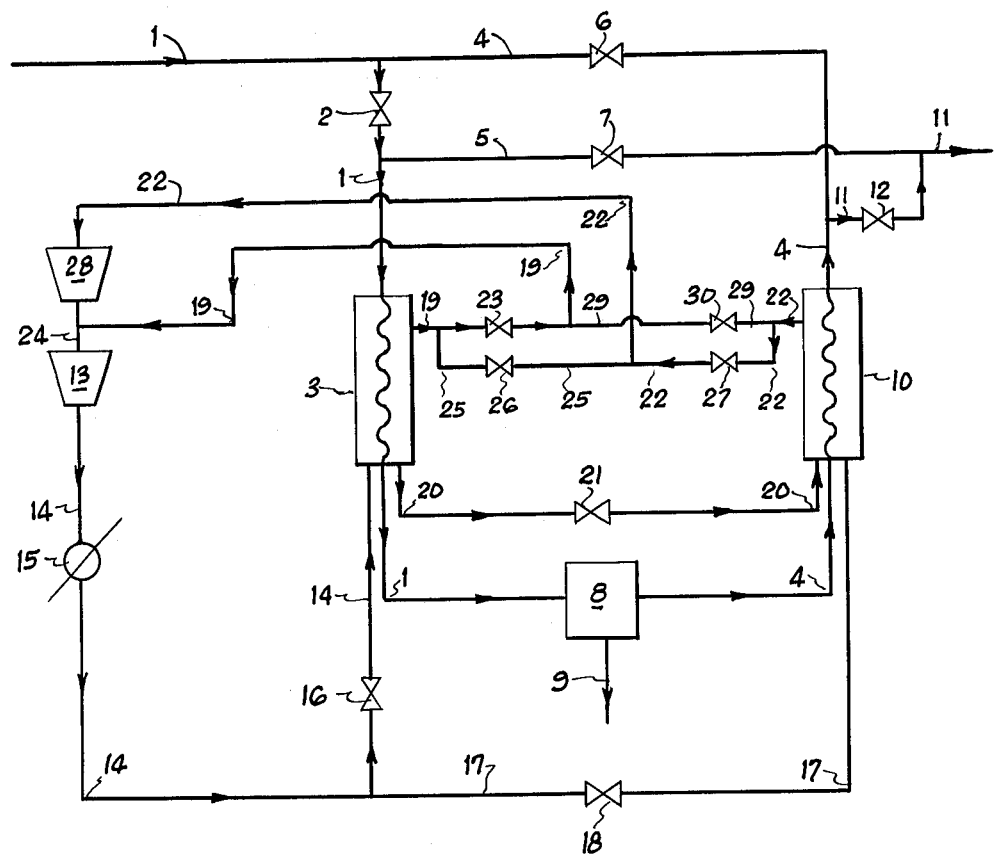
INVENTOR.
Jackson O. Carr
BY
Oome, McDougall & Hersh
Attys

United States Patent Office 3,261,167
Patented July 19, 1966

3,261,167
METHOD FOR REMOVAL OF CONTAMINANTS FROM GAS
Jackson O. Carr, Overland Park, Kans., assignor to Conch International Methane Limited, Nassau, Bahamas, a corporation of the Bahamas
Filed Sept. 19, 1962, Ser. No. 224,646
4 Claims. (Cl. 62—12)

This invention concerns a method of cooling a gas containing contaminants that deposit in solid form at the the temperature to which the gas is to be cooled.

A gas can be cooled by passing it through an evaporative cooler, wherein it is cooled by indirect heat exchange with an evaporating refrigerant. The cooling produced by the evaporative cooler depends upon the pressure under which the refrigerant evaporates; that is, a reduction in pressure over the evaporating refrigerant will produce a reduction in temperature of the evaporating refrigerant, thereby producing a greater cooling effect. A convenient method of cooling the gas is to pass it through a pair of evaporative coolers connected in series operating at different pressures, whereof the first evaporative cooler passed through by the gas operates at the higher pressure. In this specification, an evaporative cooler operating at a higher pressure than another evaporative cooler will hereinafter be referred to as a higher pressure evaporative cooler, the other evaporative cooler being hereinafter referred to as a lower pressure evaporative cooler.

It has been found that if a gas containing contaminants that deposit in solid form at the temperature to which the gas is to be cooled is first passed through a higher pressure evaporative cooler operating at a temperature at which part of the contaminants liquefy and then passed through a lower pressure evaporative cooler operating at the temperature to which the gas is to be cooled, means being provided between said coolers for removing liquid condensates from the gas to be cooled, some or all of the contaminants present in the gas passing through the lower pressure evaporative cooler will deposit therein in solid form, thereby reducing its efficiency of cooling; for example, if the gas to be cooled is methane, or natural gas, containing one or more of the compounds including aromatic or higher boiling hydrocarbons, carbon dioxide, or water vapor, such compounds will deposit as a rime inside the lower pressure evaporative cooler. In this specification, references to methane mean pure methane or any mixtures containing methane as the major ingredient, for example natural gas.

The object of the invention is to provide a method of cooling a gas containing contaminants that deposit in solid form at the temperature to which the gas is to be cooled by means of a higher pressure evaporative cooler operating at a temperature at which the contaminants liquefy and a lower pressure evaporative cooler operating at the temperature to which the gas is to be cooled, wherein the lower pressure evaporative cooler can be freed from contaminants deposited in solid form inside it.

According to the invention, a method of cooling a gas containing contaminants that deposit in solid form at the temperature to which the gas is to be cooled comprises first passing the gas through a higher pressure evaporative cooler operating at a temperature at which the contaminants liquefy and then passing it through a lower pressure evaporative cooler operating at the temperature to which the gas is to be cooled, means being provided between said coolers for removing liquid condensates from the gas; and periodically altering the direction of flow of the gas through said coolers while simultaneously changing the higher pressure evaporative cooler to lower pressure operation, and simultaneously changing the lower pressure evaporative cooler to higher pressure operation.

The refrigerant evaporating at the different pressures inside the evaporative coolers is preferably passed through said coolers in series. Evaporated refrigerant from the lower pressure evaporative cooler is preferably compressed to the pressure of the evaporated refrigerant from the higher pressure evaporative cooler, mixed therewith, compressed, cooled, liquefied, and used as liquid refrigerant for the higher pressure evaporative cooler. The refrigerant, for example, can be ethylene, ethane, propane, Freon or methane.

The means provided between the evaporative coolers to remove liquid condensates from the gas to be cooled enable the gas to be purified to a certain extent. The liquids can be removed as by means of a decanter, liquid trap, or cyclone.

The changing of the lower pressure evaporative cooler to higher pressure operation increases the temperature within said cooler, thereby enabling the deposited contaminants to melt and be entrained by the gas to be cooled.

The invention is further illustrated by the following example, wherein reference is made to the accompanying drawing.

*Example*

Natural gas at ambient temperature and pressure, and preferably after the water vapor has been reduced as by a desiccant, enters the system via conduit 1 and passes via valve 2 through the evaporative cooler 3 where it is cooled to 25° F. by indirect heat exchange with propane, as hereinafter described. The natural gas in conduit 1 is prevented from passing through conduits 4 and 5 by valves 6 and 7, respectively. Controlled natural gas, together with water vapor and water liquefied by the cooling, passes into separator 8 wherein the liquefied water is separated via conduit 9. Natural gas containing residual water vapor passes from the separator 8 into conduit 4 and through the evaporative cooler 10 where it is cooled to —35° F. by indirect heat exchange with propane, as hereinafter described. During the latter cooling, water vapor in the natural gas forms a deposit or scale on the inner wall of conduit 4 inside evaporative cooler 10. Cooled natural gas containing a minor amount of water vapor then passes into conduit 11 and through valve 12 to be collected as a product.

The cooling in evaporative coolers 3 and 10 is effected in the folowing manner: Gaseous propane under a pressure of 190 p.s.i.a. passes from compressor 13 into conduit 14, and through water cooler 15 where it is cooled to 100° F. by indirect heat exchange with water, and thereby liquefied. The liquid propane in conduit 14 passes through expansion valve 16, whereby it is cooled to 20° F. and enters the evaporative cooler 3 under a pressure of 55 p.s.i.a. The liquid propane in conduit 14 is prevented from passing through conduit 17 by expansion valve 18, which is shut. Part of the liquid propane in evaporative cooler 3 evaporates, and passes into conduit 19 as a saturated vapor, and the remainder thereof passes as a liquid under 55 p.s.i.a. into conduit 20, and through expansion valve 21, whereby it is cooled to −40° F., into evaporative cooler 10 under a pressure of 16 p.s.i.a. The propane in evaporative cooler 3 cools natural gas in conduit 1, as hereinbefore described. Liquid propane in evaporative cooler 10 evaporates and passes into conduit 22 as a saturated vapor. The propane in exaporative cooler 10 cools natural gas in conduit 4, as hereinbefore described. Propane vapor in conduit 19 passes via valve 23 into conduit 24. The propane vapor is prevented from passing through conduits 25 and 29 by valves 26 and 30 respectively. Compressed gaseous propane pases from the compressor 28 into conduit 24 for mixture with the propane vapor from conduit 19 and enters the compressor 13, wherein it is recompressed to 190 p.s.i.a.

In order to remove the deposit or scale from the inner wall of conduit 4 inside the evaporative cooler 10, valves 2, 6, 7, 12, 16, 21, 23, 26, 27 and 30 are adjusted to make the natural gas feedstock pass through evaporative cooler 10 before evaporative cooler 3 and to make evaporative cooler 10 operate at higher pressure than evaporative cooler 3. Under these conditions, natural gas at ambient temperature and pressure, containing water vapor, enters the system via conduit 1, passes via conduit 4 and valve 6 through evaporative cooler 10 wherein it is cooled to 25° F. by indirect heat exchange with propane, as hereinafter described. The natural gas in conduit 1 is prevented from continuing to pass therethrough by valve 2. Cooled natural gas, together with water vapor and water liquefied by the cooling, including water and water vapor formed from the deposit on conduit 4, passes into separator 8 from which the liquefied water is drawn off via conduit 9. Natural gas containing water vapor passes from separator 8 into conduit 1, and through evaporative cooler 3 wherein it is cooled to −35° F. by indirect heat exchange with propane, as hereinafter described. During the latter cooling, water vapor in the natural gas forms a deposit or scale on the inner wall of conduit 1 inside of evaporative cooler 3. Cooled natural gas containing a minor amount of water vapor then passes via conduit 5 and valve 7 into conduit 11 to be collected as a product.

The cooling in evaporative coolers 10 and 3 is effected in the following manner: Gaseous propane under a pressure of 190 p.s.i.a. passes from compressor 13 into conduit 14 and through water cooler 15, wherein it is cooled to 100° F. by indirect heat exchange with water, and thereby liquefied. Liquid propane enters conduit 17, passes through expansion valve 18 where it is cooled to 20° F. and enters evaporative cooler 10 under a pressure of 55 p.s.i.a. The liquid propane in conduit 14 is prevented from continuing to pass therethrough by expansion valve 16, which is shut. Part of the liquid propane in evaporative cooler 10 evaporates and passes into conduit 22 as a saturated vapor, and the remainder thereof passes into conduit 20, and through expansion valve 21 whereby it is cooled to −40° F., and into evaporative cooler 3 under a pressure of 16 p.s.i.a. The propane in evaporative cooler 10 cools natural gas in conduit 4, as hereinbefore described. Liquid propane in evaporative cooler 3 evaporates and passes into conduit 19 as a saturated vapor. The propane in evaporative cooler 3 cools natural gas in conduit 1, as hereinbefore described. Propane vapor entering conduit 22 passes via conduit 29, valve 30, and conduit 19 into conduit 24. The propane vapor is not able to pass through valve 23 in conduit 19 and is prevented from passing through conduit 22 by valve 27. Propane vapor entering conduit 19 passes via conduit 25, valve 26, and conduit 22 into the compressor 28 wherein it is recompressed to 55 p.s.i.a. The propane vapor is not able to pass through valve 27 in conduit 22 and is prevented from passing through conduit 19 by valve 23. Compressed gaseous propane passes from compressor 28 into conduit 24 for mixture with the propane vapor from conduit 19 and enters the compressor 13, wherein it is recompressed to 190 p.s.i.a.

The deposit formed on the inner wall of conduit 1 inside evaporative cooler 3 can be removed by readjusting valves 2, 6, 7, 12, 21, 23, 26, 27 and 30 to make the natural gas feed-stock pass through evaporative cooler 3 before evaporative cooler 10 and to make evaporative cooler 3 operate as the high pressure cooler and evaporative cooler 10 as the low pressure cooler, as in the setting originally described.

It will be understood that changes may be made in the details of arrangement and pressure conditions existing, depending upon the materials that are being removed from the natural gas or methane, and that other changes may be made in the details of construction, arrangement and operation, without departing from the spirit of the invention, especially as defined in the following claims.

I claim:

1. The method of cooling a gas which contains contaminants that deposit in liquid and solid form at the temperature to which the gas is to be cooled, said method comprising operations (a) and (b) as follows:

(a) passing the gas into indirect heat exchange with a liquid refrigerant evaporating in a first evaporative cooler wherein the refrigerant is evaporating at a temperature at which said contaminants liquefy without liquefying the gas, thereafter passing the gas in indirect heat exchange with said refrigerant evaporating in a second evaporative cooler, wherein said refrigerant is evaporating at the lower temperature to which the gas is to be cooled without liquefying the gas whereby said contaminants will solidify, passing said refrigerant from said first evaporative cooler to said second evaporative cooler through an expansion device, and removing liquefied contaminants from said gas between said coolers;

(b) reversing the flow paths of the gas and refrigerant by passing said gas in indirect heat exchange with said refrigerant evaporating in said second evaporative cooler wherein the refrigerant is evaporating at a temperature at which said contaminants liquefy without liquefying the gas, thereafter passing said gas in indirect heat exchange with said refrigerant evaporating in said first evaporative cooler wherein said refrigerant is evaporating at said lower temperature to which said gas is to be cooled without liquefying the gas and at which said contaminants solidify, passing said refrigerant from said second evaporative cooler to said first evaporative cooler through an expansion device, and removing liquefied contaminants from said gas between said coolers;

said method involving the steps of supplying said gas, first conducting operation (a) on said gas, thereafter conducting operation (b) on said gas and continuing said operations in alternating sequence while the supply of gas continues.

2. A method as claimed in claim 1 wherein evaporated refrigerant from the evaporative cooler operating at said lower temperature is compressed to the pressure of the evaporated refrigerant from the evaporative cooler operating at the higher temperature, mixed therewith, compressed, cooled, liquefied and passed as liquid refrigerant to the evaporative cooler operating at the higher temperature.

3. A method as claimed in claim 1, wherein the refrigerant is selected from the group consisting of ethylene, ethane, propane, Freon or methane.

4. A method as claimed in claim 3, wherein the gas to be cooled is natural gas.

References Cited by the Examiner

UNITED STATES PATENTS 1,455,580   5/1923   Ferguson _____ 62—198
2,022,782  12/1935   Pollitzer _____ 62—12

(Other references on following page)

UNITED STATES PATENTS

| | | | |
|---|---|---|---|
| 2,134,699 | 11/1938 | Brewster | 62—40 X |
| 2,524,397 | 10/1950 | Toberts | 62—11 |
| 2,561,720 | 7/1951 | Alleman | 62—40 X |
| 2,584,985 | 2/1952 | Cicalese | 62—13 |
| 2,698,523 | 1/1955 | Hailicka | 62—12 |
| 2,823,523 | 2/1958 | Eakin. | |
| 2,896,414 | 7/1959 | Tung | 42—40 X |
| 2,959,022 | 11/1960 | Twomey | 62—40 X |
| 2,960,837 | 11/1960 | Swenson | 62—40 X |
| 3,020,723 | 2/1962 | De Lury | 62—40 X |
| 3,092,076 | 6/1963 | Hashemi-Tafreshi | 62—40 X |
| 3,093,470 | 6/1963 | Melikian | 62—12 X |
| 3,144,316 | 8/1964 | Koehn | 62—40 X |

FOREIGN PATENTS

| | | |
|---|---|---|
| 1,201,884 | 7/1959 | France. |
| 644,139 | 4/1937 | Germany. |
| 1,047,808 | 12/1958 | Germany. |

NORMAN YUDKOFF, *Primary Examiner.*

ROBERT A. O'LEARY, *Examiner.*